Dec. 19, 1967  D. H. BRAUN ETAL  3,358,995
COIN CONTROL FOR POOL TABLES
Filed March 17, 1965  7 Sheets-Sheet 1
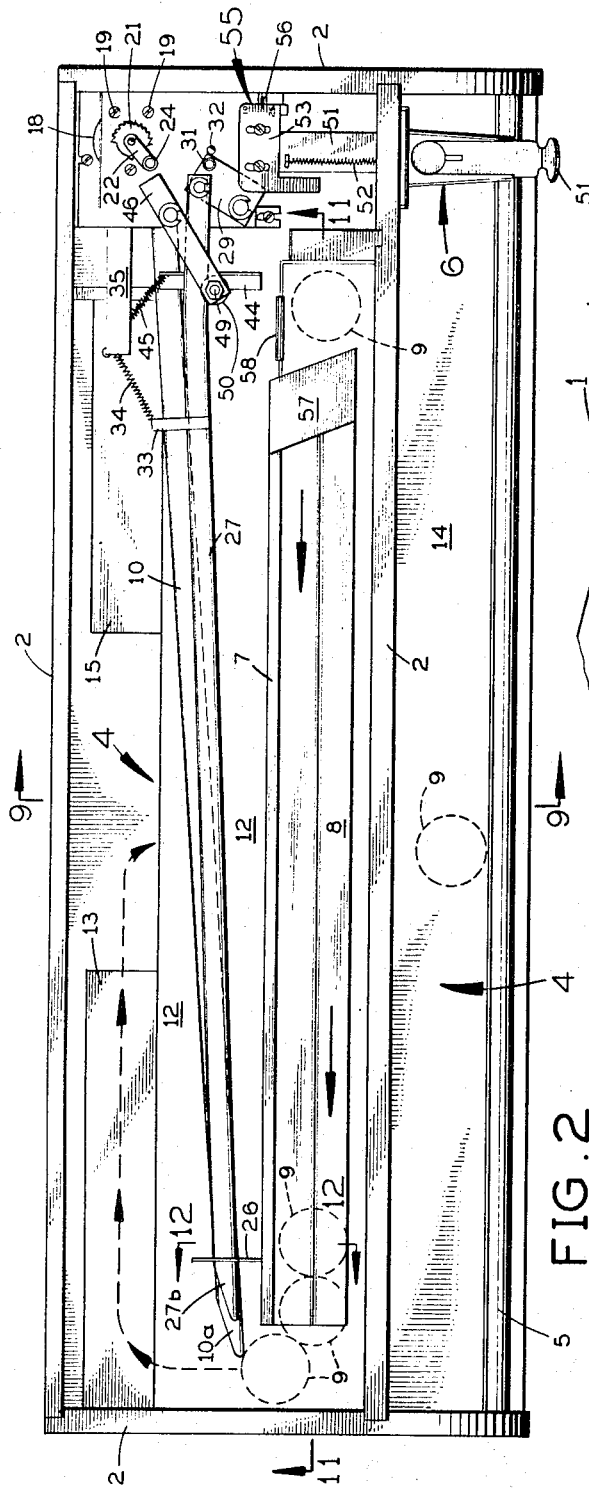
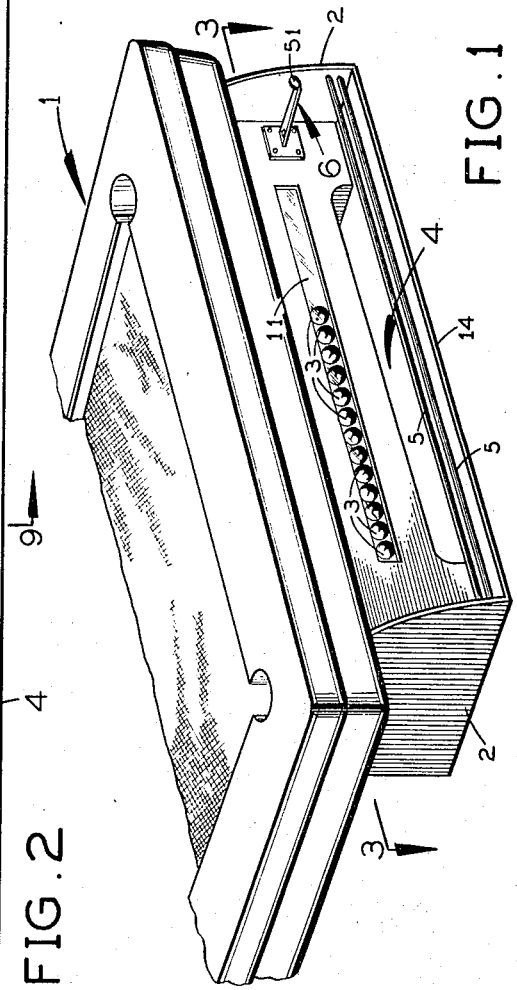
INVENTORS
DAVID H. BRAUN
HARVEY HEISS
BY

INVENTORS
DAVID H. BRAUN
HARVEY HEISS

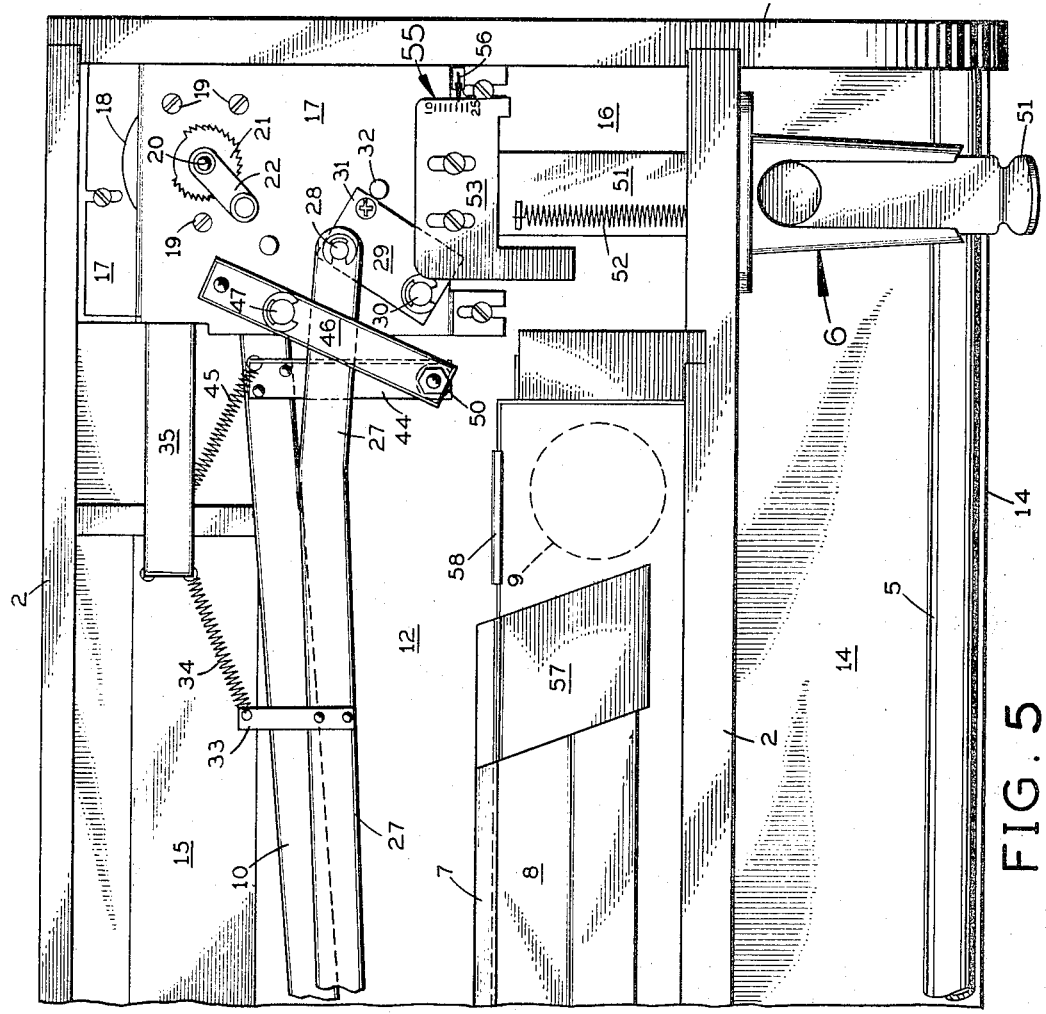
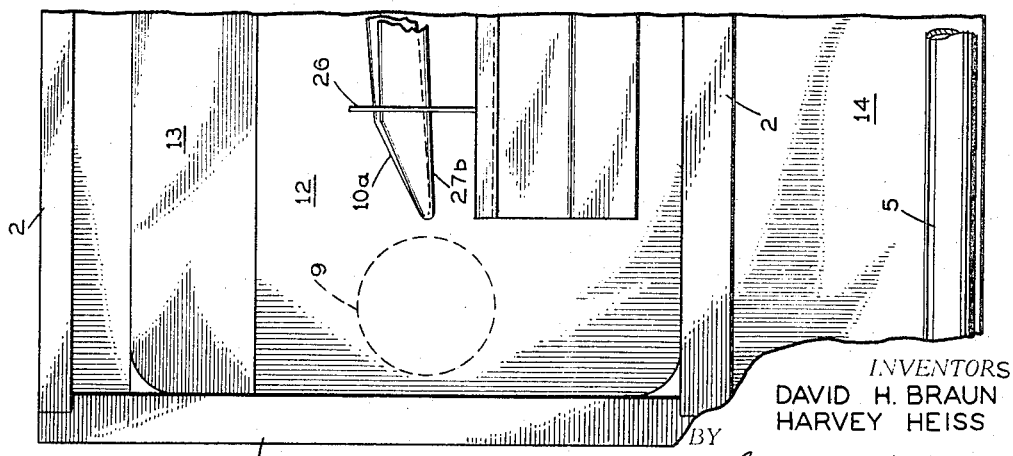
FIG. 5
INVENTORS
DAVID H. BRAUN
HARVEY HEISS

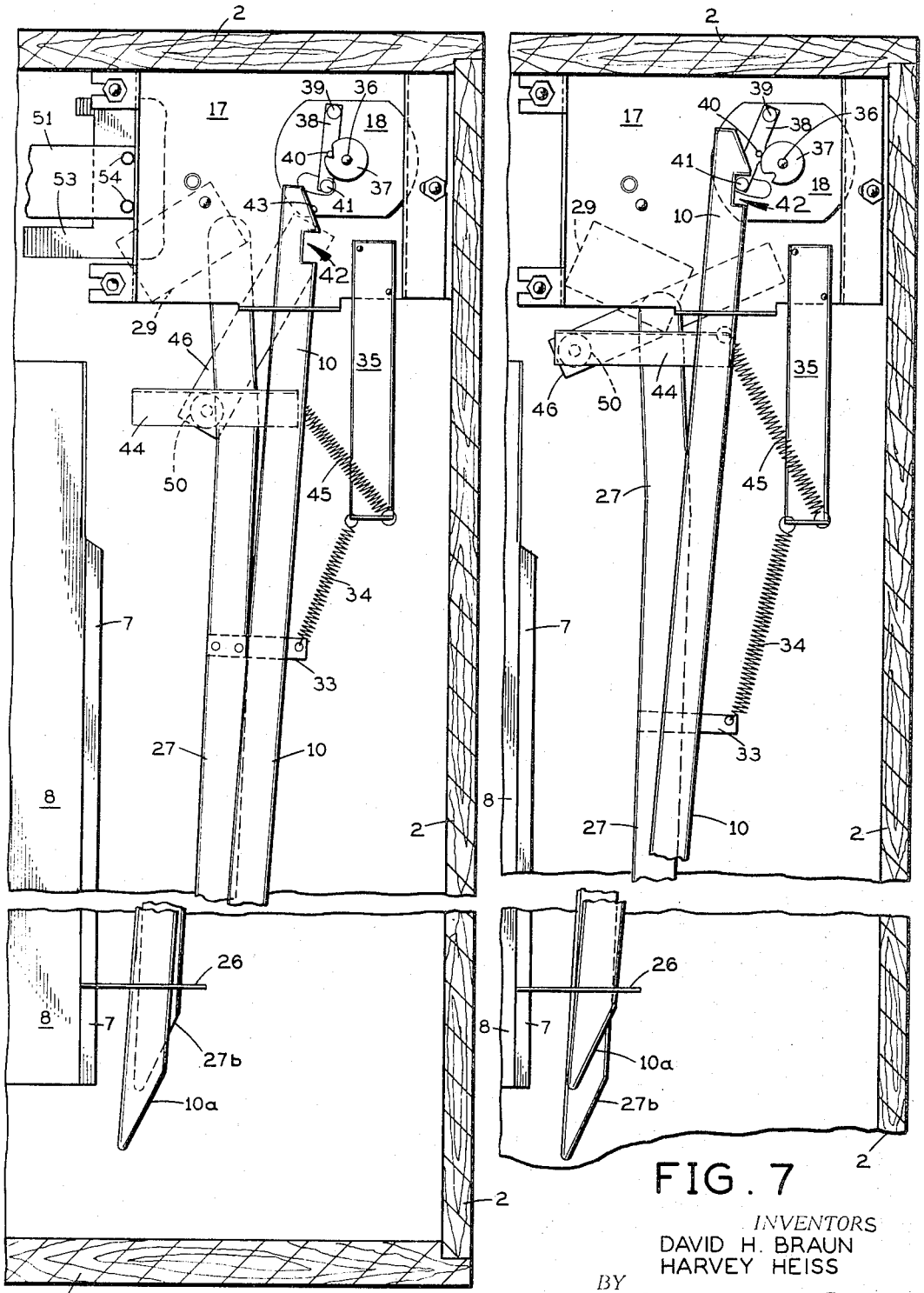

Dec. 19, 1967 D. H. BRAUN ETAL 3,358,995
COIN CONTROL FOR POOL TABLES
Filed March 17, 1965 7 Sheets-Sheet 6

INVENTORS
DAVID H. BRAUN
HARVEY HEISS
BY
Lloyd J. Andres

Dec. 19, 1967   D. H. BRAUN ETAL   3,358,995
COIN CONTROL FOR POOL TABLES
Filed March 17, 1965   7 Sheets-Sheet 7

INVENTORS
DAVID H. BRAUN
HARVEY HEISS
BY

United States Patent Office 3,358,995
Patented Dec. 19, 1967

3,358,995
COIN CONTROL FOR POOL TABLES
David H. Braun, Miami, and Harvey Heiss, North Miami, Fla., assignors to All Tech Industries, Inc., Hialeah, Fla., a corporation of Florida
Filed Mar. 17, 1965, Ser. No. 440,409
3 Claims. (Cl. 273—11)

ABSTRACT OF THE DISCLOSURE

A coin actuated attachment for pool tables for releasing all of the pool balls therefrom for play upon the deposit of a predetermined coin including a timer means for confining the pocketed return of each of the played balls following a predetermined timed interval.

---

This invention relates in general to coin controlled pool tables and more particularly to an adjustable coin control for limiting the time period for each game and for the coin release of balls for successive games.

This mechanism provides mechanical construction substantially equivalent in results obtained to our pending U.S. application for Coin Operated Pool Table, Ser. No. 359,593, filed Apr. 14, 1964 now Patent No. 3,304,085.

A principal object of the invention is the provision of a manually operated timing means whereby the insertion of a coin of predetermined denomination therein will release the pool balls in a pool table for manual transfer for play and for automatically retaining any of the pool balls within the table upon the expiration of a predetermined time periods related to the coins deposited.

A further object of the invention is the provision of a mechanical timer means responsive to a manually reciprocated or oscillatory coin receiver for automatically setting the timer to operate for a predetermined time and moving a release lever for operating a barrier means responsive thereto.

Another object of the invention includes the mechanism previously set forth in the above objects including an adjustable means related to the timer and the coin receiver for adjustably predetermining the time period of play.

These and other objects and advantages in one embodiment of the invention are described and shown in the following specification and drawings, in which:

FIG. 1 is a fragmentary perspective view of one end of a pool table including the present invention, in reduced scale.

FIG. 2 is an enlarged cross sectional plan view taken through section line 3—3, FIG. 1.

FIG. 5 is the same as FIG. 3, in further changed position.

FIG. 6 is a fragmentary bottom plan view of a portion of the elements shown in FIG. 1.

FIG. 7 is the same as FIG. 6, in changed position.

Figure 3:
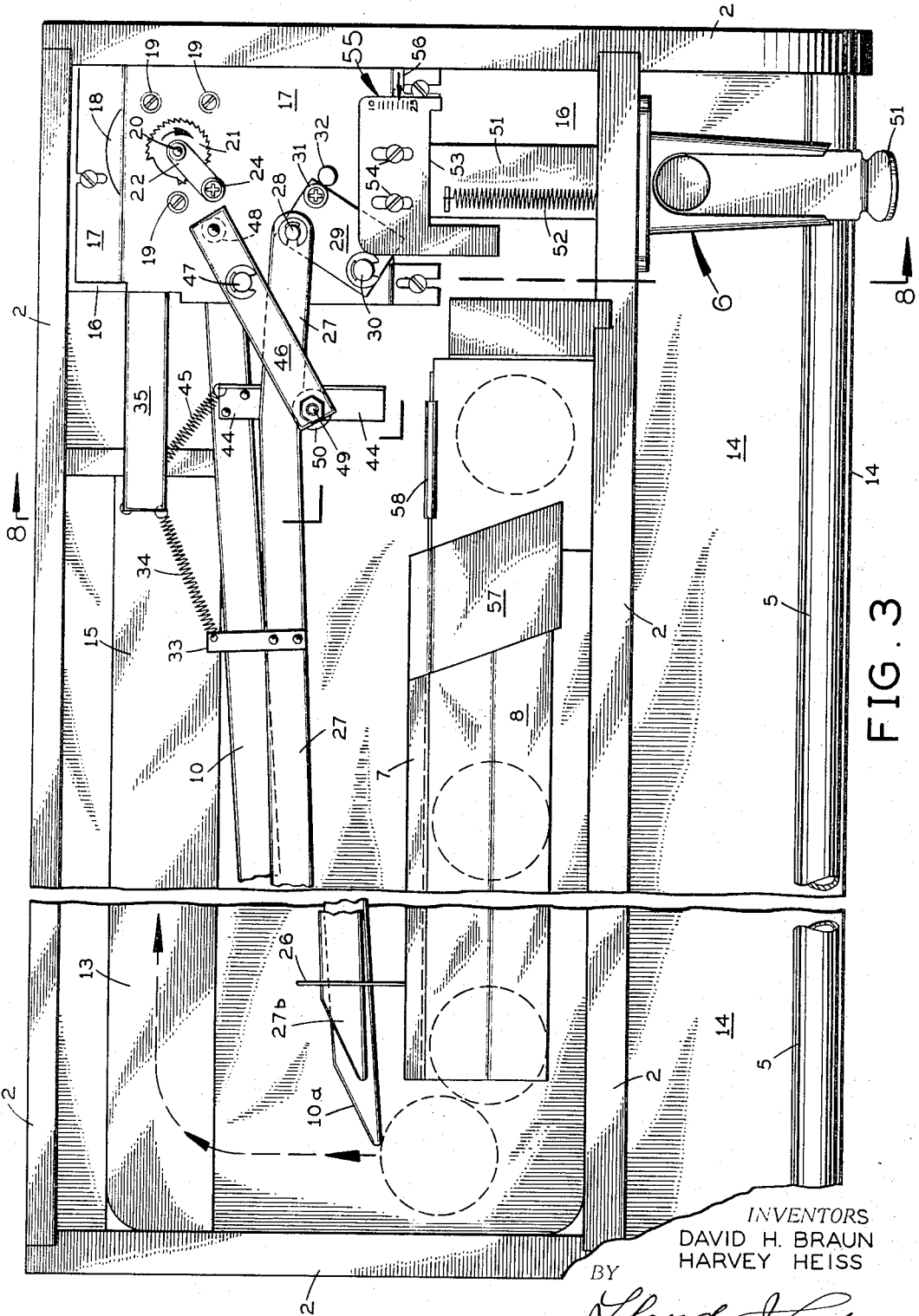
FIG. 3 is a fragmentary further enlarged view of the view shown in FIG. 2.

Referring to FIG. 1, an end portion of a typical pool table assembly 1 shows a casing 2 secured to the underside of the table by well known means, preferably as a lockable drawer, into which the balls 3 to be played are visible to the user. The casing or drawer also contains a manually accessible compartment 4 in which the balls will gravitate and be retained in a row behind rods 5 when the coin mechanism 6 is operated, by means hereinafter described.

Referring to FIG. 2, an inlet runway 7 having a V-shaped bottom 8 is secured in casing 2 parallel with the front wall thereof and sloped in the direction shown by arrows for receiving a ball 9 gravitated into the right end thereof as illustrated and conducting same to a position against the left wall of casing 2 and the end of bar 10, acting as a barrier 10a.

The runway is intended to retain the entire number of balls used in the game, ordinarily fifteen object balls and one cue ball, which will be retained in a row visible from the front of the casing through a transparent window 11, best shown in FIG. 1.

A transverse mid-floor 12, sloped rearward, forming a second runway, will convey the balls by gravity, when released by barriers 10a and 27b down a second runway 13 to the lower floor 14 of the casing where they will roll forward in a row against rods 5 by virtue of the forward slope of the floor 14.

It is to be understood that the six pockets of a conventional pool table connect with internal runways constructed and adapted to gravity feed pocketed balls in sequence through an outlet, not shown, into the entrance to the upper end of runway 8 when the casing 2 is properly positioned. A third runway 15 sloping opposite to that of runway 13 is positioned only to receive and conduct any ball along the forward sloping bottom of casing 2, which ball may have been retained in the pool table runway when the drawer or casing 2 is being withdrawn from the table.

Figure 8:
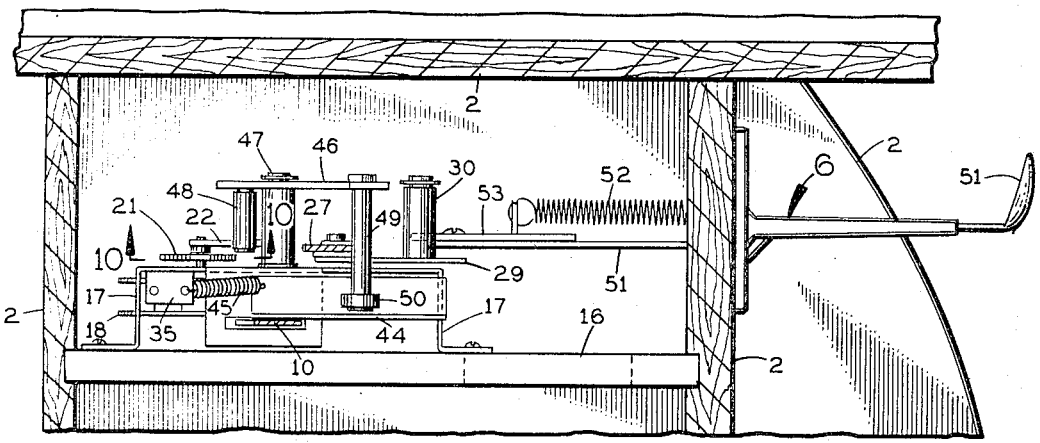
FIG. 8 is a cross sectional end view taken through section line 8—8, FIG. 3.
Figure 9:
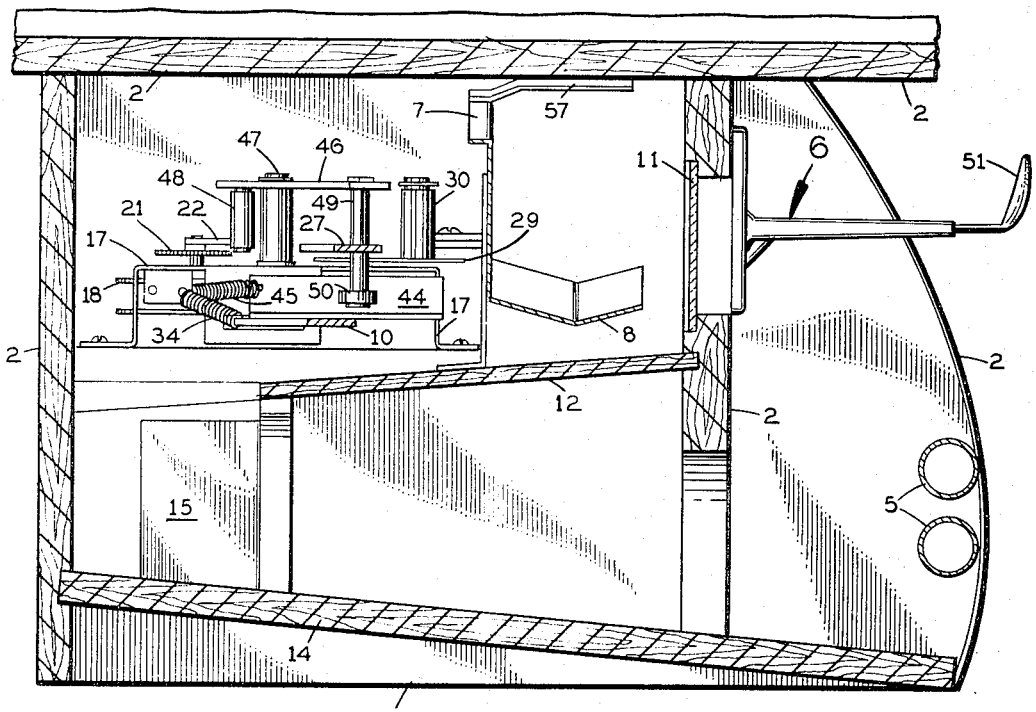
FIG. 9 is a cross sectional end view taken through section line 9—9, FIG. 2.
Figure 10:
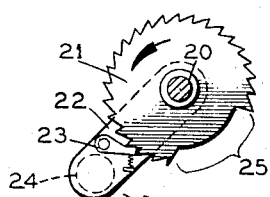
FIG. 10 is a cross sectional bottom plan view taken through section line 10—10, FIG. 8.

Referring to FIGS. 3 and 8, a horizontal shelf 16 is secured in the right-hand portion of the casing 2 for supporting a timing and control mechanism. A spring operated timer 18 is secured to chassis 17 by three screws 19 into the chassis, as shown. The timer is of the general type such as used in parking meters and is wound by the clockwise rotation of shaft 20 to which is coaxially secured a ratchet wheel 21, which wheel is rotated predetermined distances in the direction shown by arrow by the oscillation of an arm 22 journalled for free rotation about shaft 20, through a pawl means 23, pivoted thereon, a bottom view of which is shown in FIG. 10. An upstanding roller 24 is secured for rotation to the outer end of arm 22. FIG. 10 also shows the absence of a predetermined number of teeth through an angle 25 for reasons to be hereinafter described.

Figure 12:
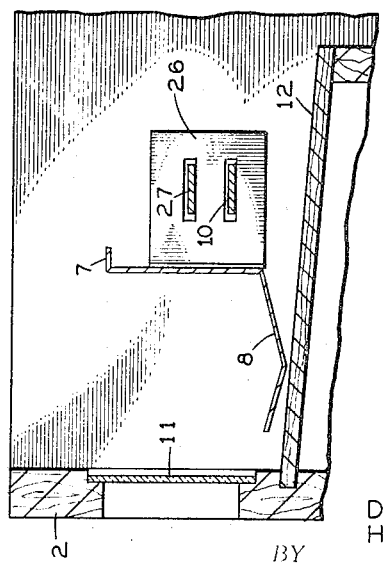
FIG. 12 is a cross sectional end elevation taken through section line 12—12, FIG. 2.

Referring to FIGS. 2 and 3, the barrier member or bar 10 is slidably retained in a bracket 26, secured to runway 7, together with a superposed slidable mating bar 27, terminating in a barrier 27b, also shown in FIG. 12. Bar 27 is pivotally secured to a stud 28 at a bell crank 29, which is pivoted to chassis 17 by an upstanding stud 30. An upstanding roller 31 is secured to bell crank 29, with the crank normally resting against stop pin 32, as shown. A bracket 33 secured to bar 27 retains one end of a spring 34, which is secured to an extension 35 of chassis 17 for the purpose of urging bar 27 in the position shown.

Referring to FIGS. 1, 3, and 6, a timing shaft 36 projecting from the underside of the timer 18 has a cam 37 secured thereon and a release lever 38 pivoted on the timer frame about stud 39, and urged into position shown in FIG. 6 by spring means in the timer, not shown. The lever carries a pin 40, positioned and adapted to engage a recess in the periphery of cam 37. An upstanding stud 41 in the outer end of lever 38 is adapted to engage a notch 42 in bar 10 when cammed therein by the sloping end 43 of the bar. A linear rail 44 is secured to bar 10 having a vertical track formed thereon, the action of which will be hereinafter described. A spring 45 has one end connected to bar 10 and the opposite end connected to extension 35, for urging the bar in right hand withdrawn direction.

Referring to FIG. 3, a lever 46 is pivoted to chassis 17 on shoulder stud 47 and has a downward depending roller 48 secured at one end thereof and a downward depending shoulder stud 49 at the opposite end thereof, which stud retains a roller 50, positioned to traverse along the vertical track of the rail 44.

A slide member 51 of the coin mechanism 6 is normally urged in its outward position, as shown in FIG. 3, by a spring 52 secured to the inner portion thereof, for exposing the coin pocket therein. A plate 53 is secured for longitudinal adjustment on the inner end of slide 51 by screws 54. An index 55, graduated in relative time, is impressed on plate 53 and corresponds with a pointer 56 fixed to casing 2.

A barrier 57 bridges over runway 7 and a bumper 58 is provided to guide each ball descending from the table outlet onto runway 7 for descent in a left hand direction.

Figure 13:
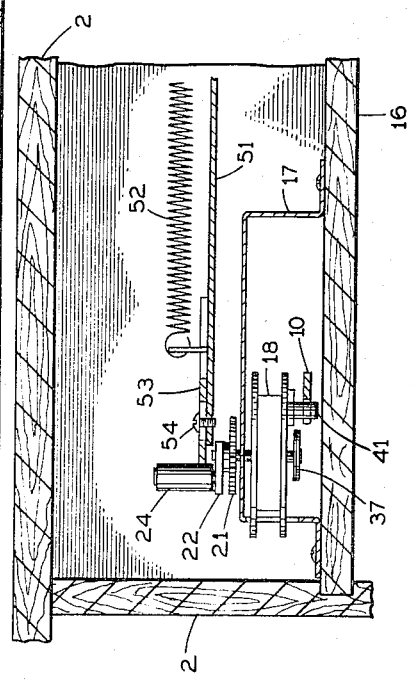
FIG. 13 is a cross sectional end elevation taken through section line 13—13, FIG. 4.

The relative vertical position of the slide 51 and plate 53 with respect to the chassis 17 is shown in FIG. 13 with the roller 24 for winding the timer 18 shown in contact with plate 53. This cross section also shows the relative vertical position of the bar 10 with respect to stud 41 and also shows the relative position of the ratchet wheel 21 fixed to the timer shaft and the arm 22 journalled thereon, which arm carries pawl 23, as shown in FIG. 10.

Figure 11:
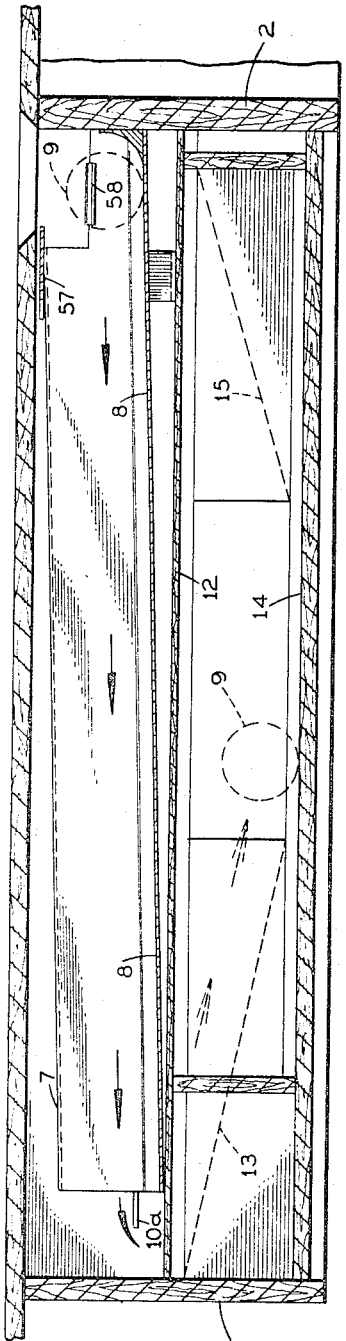
FIG. 11 is a cross sectional front elevation taken through section line 11—11, FIG. 2.

When each ball 9 is dropped from the outlet of the common runway in the table onto the runway 7, as shown in dotted lines in FIG. 3, and then referring to FIG. 11, it will gravitate along the dotted lines as shown and descend rearward on shelf 12 and further descend on the inclined runway 13 and then forward on the forward sloping floor 14 where the balls will accumulate in the open compartment 4, against rods 5.

The absence of a predetermined number of teeth in ratchet wheel 21, shown in FIG. 10, is to prevent a jamming condition which would occur if the device was overwound by the deposit of an excess number of coins, which would prohibit the normal release of the pawl means 23.

In operation and referring to FIG. 1, a proper coin is deposited in coin mechanism 6 and the slide 51 pushed inward its full travel, depositing the coin in a cash box, not shown. This will release the object balls and the cue ball to gravitate from the runway behind the window 11 into compartment 4 along paths previously described. The balls then may be manually removed and racked on the table for play in conventional manner.

Figure 4:
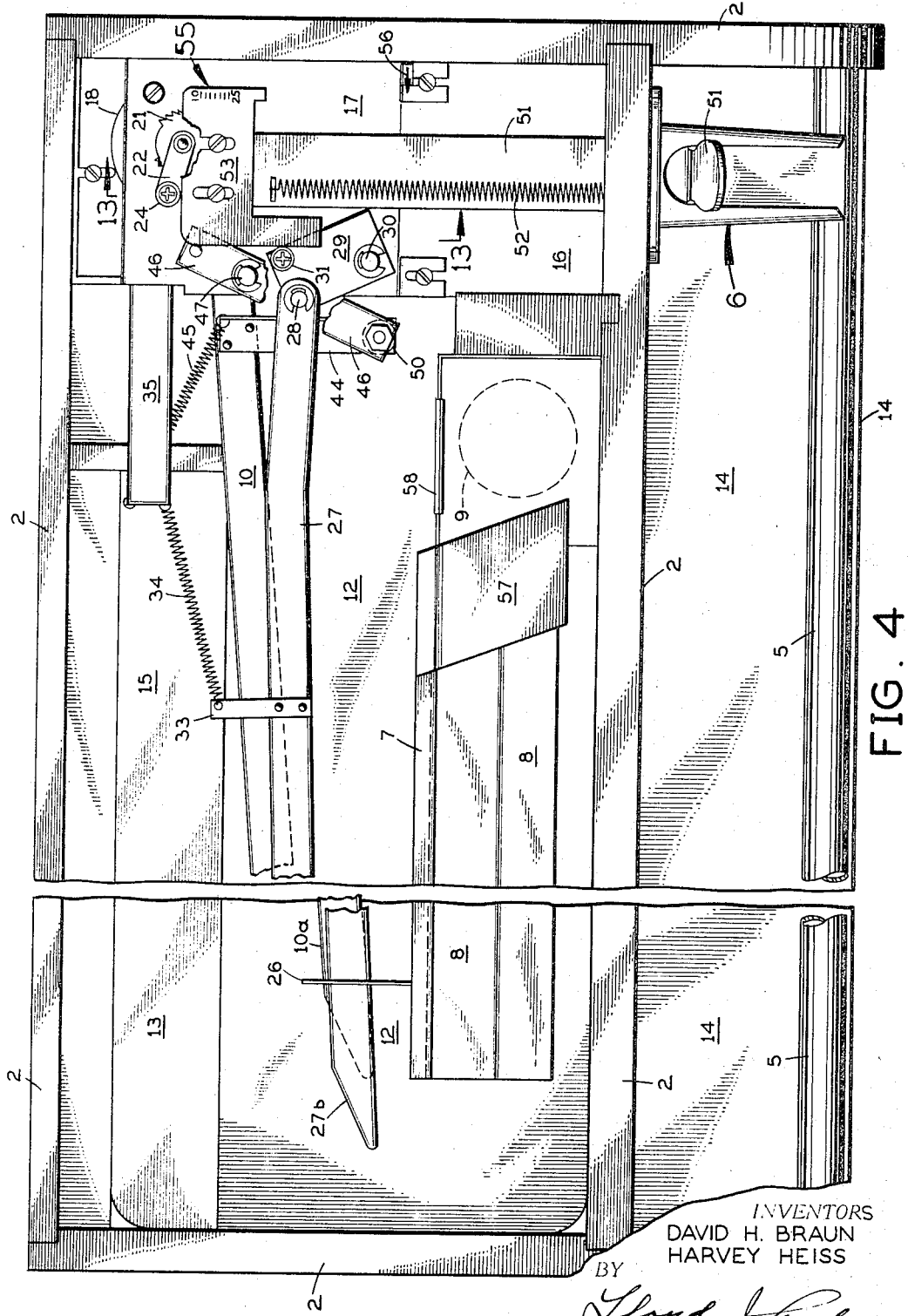
FIG. 4 is the same as FIG. 3, in changed position.

Before the deposit of a coin in coin mechanism 6, the elements assume their idle position, as shown in FIG. 3, with the balls retained on runway 7 by the projecting barrier 10a of bar 10, as shown. Referring to FIG. 4, and when the slide 51 is moved fully inward against the restraining action of spring 52, the left hand side of the plate 53 will first engage roller 31 and rotate crank 29 and move bar 27 with its barrier end 27b thereof to the position shown in full lines, which still prevents the balls from gravitating into compartment 4. Simultaneously, the inner edge of plate 53 will engage roller 24 and rotate arm 22 through an adjusted predetermined timing angle. This action will rotate ratchet wheel 21 by virtue of the pawl shown in FIG. 10, and wind the time for a pre-adjusted timer interval, corresponding to a predetermined angle or rotation of cam 37, shown in FIG. 7.

Referring to FIG. 6 and prior to the insertion of a coin and the inward movement of slide 51, bar 10 was urged into the position shown in FIG. 3 for retaining the balls by the action of spring 45, however, again referring to FIG. 3, when the plate 53 is moved to its inward position, the outer end thereof will engage roller 48 and rotate lever 46 counter clockwise about stud 47, which movement will result in roller 50 traversing the track on rail 44 and moving same in a right hand direction, thus retracting the end 10a of bar 10 from the path of the balls.

The aforesaid movement of bar 10 against the restraining action of spring 45 will result in the engagement of pin 41 within the notch 42, by virtue of the camming action of the oblique surface 43 on the end of bar 10, which will hold the barrier end 10a in its withdrawn position for a period set by the timer to be hereinafter described.

It is now apparent that when the coin slide 51 is moved to its innermost position, the timer is wound for a predetermined time element by the forward or rearward adjustment of either the chassis 17 or the plate 53 on slide 51.

It is also apparent that when the coin slide 51 is in its inner position, the end 27b of bar 27 will be moved to prevent the gravitation of the balls into the compartment 4. However, when the coin slide 51 is permitted to return to its normal position, as shown in FIG. 3, then bar 27 will be withdrawn by virtue of spring 34 and permit all of the balls retained in the runway 7 to gravitate into compartment 4. This delayed action of the bars 10 and 27 is provided to prevent juggling of the coin slide to obtain fraudulent release of any of the balls.

Referring to FIG. 7, and upon the elapse of the aforesaid predetermined time period, the cam 37 will counter rotate to the position shown in FIG. 6 and thus release bar 10 to assume its left barrier position by virtue of spring 45 and thus prevent the return of any of the balls descending runway 7 and obviously prevent their use for re-play.

This invention also embraces an alternate construction whereby any one of the well known manual types of rotary coin mechanisms will simultaneously operate a spring wound timer and ball release mechanism by modifying the control elements to respond to circulatory oscillatory motion instead of above described reciprocating slide assembly 6.

It is important to note that the cue ball is of standard size, the same as the object balls, which permits its recovery following a "scratch" shot so long as the game is played during the predetermined time period, whereas in previous games of this general character, the cue ball had to be of different non-standard diameter than the object balls in order to obtain separation when a "scratch" shot was made.

It is also to be understood that certain modifications in the construction, utilizing the features above described, are intended to come within the scope of the appended claims.

Having described our invention, we claim:
1. A coin control means for a pool table including
 a passageway means therein for conducting all pocketed balls for sequential gravity descent from a single outlet therein comprising a casing secured under said table and said outlet for retaining said control means,
 a sloping linear holding runway secured in said casing with the upper end positioned under said outlet for receiving said balls and sequentially conducting same by gravity in one direction,
 a second runway means connected to and sloping downward from a junction with the lower end of said holding runway and terminating in an open compartment holding therein said balls for manual removal when propelled thereto by gravity from said second runway, a spring energized timer means in said casing including a winding means movable through a predetermined range from a rest to a wound position corresponding to operation for a said predetermined time period, said timer means including an operating member for the displacement through said range when said timer means is wound and for the continuous return displacement thereof at a substantially constant rate during the said time period, a coin actuator means in said casing including a manual coin released member movable from an idle to an operated position and vice versa upon the deposit therein of a predetermined coin for operatively engaging said winding means and moving same through said range when said coin member is moved from said idle to said operated position, a first barrier means journalled for reciprocation in said casing from a normal position with one end portion thereof intersecting said junction for holding said balls on said holding runway to a release position withdrawn from said junction, spring means biased between said casing and said first barrier means for normally urging the latter into said normal position, the opposite end portion of said first barrier means positioned for bi-lateral movement and temporary engagement with said operating member of said timer means for withdrawing said final barrier means from said junction when said timer means is wound, a lever pivoted on said casing having one end thereof positioned for engagement with said first barrier means including an abutment on the opposite end of said lever for engagement by said coin member when the latter is moved into its operated position for laterally moving and engaging said opposite end portion of said first barrier means with said operating member of said timer means, a second barrier means journalled for reciprocation in said casing from a normal position with an end portion thereof in a withdrawn position from said junction to a position intersecting said junction when operated for holding said balls on said holding runway when said first barrier means is withdrawn from said junction, spring means biased between said casing and said second barrier means for normally urging the latter with the end portion thereof into said withdrawn position, a crank means pivoted on said frame and to said second barrier means positioned for movement by said coin member when moved from said rest to said operated position for moving the said second barrier means with the end portion thereof intersecting said junction whereby the movement of said coin member from idle to said operating position will project the outer end of said second barrier means to intersect said junction and simultaneously withdraw the said end portion of said first barrier means therefrom to prevent said balls from gravitating into said compartment whereby the end portion of said second barrier means will be withdrawn from said junction by said spring means when said coin member is moved to its said idle position.

2. The construction recited in claim 1 including an extension member adjustably secured to said coin released member for engaging the said operating member of said timer means for changing the said range thereof within predetermined limits for adjusting said time period accordingly.

3. The construction recited in claim 1 wherein said first barrier means includes
a transverse rail,
a roller pivoted on the outer end of said lever in engagement with said rail whereby the movement of said lever by said coin member will cam said roller along said rail against the restraining action of said first mentioned spring means for moving said first barrier means and withdrawing said end portion thereof from said junction and engaging the opposite end portion thereof with said operating means of said timer for release therefrom following said time period.

References Cited
UNITED STATES PATENTS

| | | | |
|---|---|---|---|
| 1,938,265 | 12/1933 | Thomas | 273—11 |
| 2,297,264 | 9/1942 | Veneri | 273—3.1 |
| 3,084,936 | 4/1963 | Sikes | 273—11 |

LOUIS G. MANCENE, *Primary Examiner.*

RICHARD C. PINKHAM, *Examiner.*

R. F. CUTTING, *Assistant Examiner.*